(12) United States Patent
Therien et al.

(10) Patent No.: US 9,442,739 B2
(45) Date of Patent: Sep. 13, 2016

(54) COLLABORATIVE PROCESSOR AND SYSTEM PERFORMANCE AND POWER MANAGEMENT

(75) Inventors: Guy M. Therien, Beaverton, OR (US); Paul S. Diefenbaugh, Portland, OR (US); Anil Aggarwal, Portland, OR (US); Andrew D. Henroid, Portland, OR (US); Jeremy J. Shrall, Portland, OR (US); Efraim Rotem, Haifa (IL); Krishnakanth V. Sistla, Beaverton, OR (US); Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 13/976,507

(22) PCT Filed: Dec. 30, 2011

(86) PCT No.: PCT/US2011/068198
§ 371 (c)(1),
(2), (4) Date: Jun. 27, 2013

(87) PCT Pub. No.: WO2013/077890
PCT Pub. Date: May 30, 2013

(65) Prior Publication Data
US 2013/0275796 A1    Oct. 17, 2013

Related U.S. Application Data

(60) Provisional application No. 61/563,030, filed on Nov. 22, 2011.

(51) Int. Cl.
*G06F 1/00* (2006.01)
*G06F 11/30* (2006.01)
(Continued)

(52) U.S. Cl.
CPC ............ *G06F 9/4403* (2013.01); *G06F 1/26* (2013.01); *G06F 1/28* (2013.01); *G06F 1/3203* (2013.01); *G06F 1/324* (2013.01); *G06F 1/3234* (2013.01); *G06F 1/3275* (2013.01); *G06F 1/3296* (2013.01); *G06F 9/22* (2013.01);
(Continued)

(58) Field of Classification Search
CPC ................... G06F 11/3466; G06F 2209/501; G06F 11/3447
See application file for complete search history.

(56) References Cited

U.S. PATENT DOCUMENTS 7,016,060 B1   3/2006  Carney et al.
7,017,060 B2   3/2006  Therien et al.
(Continued)

FOREIGN PATENT DOCUMENTS

TW     200917006      4/2009
WO     2013/077890 A1 5/2013

OTHER PUBLICATIONS

International Preliminary Report on Patentability received for PCT Patent Application No. PCT/US2011/068198, mailed on Jun. 5, 2014, 6 pages.
(Continued)

*Primary Examiner* — Xuxing Chen
(74) *Attorney, Agent, or Firm* — Green, Howard & Mughal LLP (57) ABSTRACT

The present invention relates to a platform power management scheme. In some embodiments, a platform provides a relative performance scale using one or more parameters to be requested by an OSPM system.

10 Claims, 5 Drawing Sheets

(51) Int. Cl.
- *G06F 9/44* (2006.01)
- *G06F 17/30* (2006.01)
- *G06F 9/445* (2006.01)
- *G06F 1/28* (2006.01)
- *G06F 1/32* (2006.01)
- *G06F 11/36* (2006.01)
- *G06F 1/26* (2006.01)
- *G06F 9/22* (2006.01)
- *G06F 11/34* (2006.01)

(52) U.S. Cl.
CPC .............. *G06F 9/44* (2013.01); *G06F 9/4401* (2013.01); *G06F 9/445* (2013.01); *G06F 11/3672* (2013.01); *G06F 17/30339* (2013.01); *G06F 11/3447* (2013.01); *G06F 11/3466* (2013.01); *G06F 2209/501* (2013.01); *Y02B 60/1217* (2013.01); *Y02B 60/1285* (2013.01)

(56) References Cited

U.S. PATENT DOCUMENTS

| | | |
|---|---|---|
| 7,089,430 B2 * | 8/2006 | Cooper .................. 713/300 |
| 2005/0125702 A1 | 6/2005 | Huang et al. |
| 2009/0327609 A1 | 12/2009 | Fleming et al. |
| 2010/0162023 A1 | 6/2010 | Rotem et al. |

OTHER PUBLICATIONS

Taiwan Search Report for Taiwan Patent Application No. 101142626, completed Sep. 17, 2014.
Taiwan Notice of Allowance for Taiwan Patent Application No. 101142626, mailed Sep. 23, 2014.
International Search Report and Written Opinion received for PCT Patent Application No. PCT/US2011/068198, mailed on Nov. 23, 2012, 9 pages.

* cited by examiner

```
Package
{
        NumEntries,                              // Integer
        Revision,                                // Integer
        HighestPerformance,                      // Integer or Buffer (Resource Descriptor)
        NominalPerformance,                      // Integer or Buffer (Resource Descriptor)
        LowestNonlinearPerformance,              // Integer or Buffer (Resource Descriptor)
        LowestPerformance,                       // Integer or Buffer (Resource Descriptor)
        GuaranteedPerformanceRegister,           // Buffer (Resource Descriptor)
        DesiredPerformanceRegister,              // Buffer (Resource Descriptor)
        MinimumPerformanceRegister,              // Buffer (Resource Descriptor)
        MaximumPerformanceRegister,              // Buffer (Resource Descriptor)
        PerformanceReductionToleranceRegister,   // Buffer (Resource Descriptor)
        TimeWindowRegister,                      // Buffer (Resource Descriptor)
        CounterWraparoundTime,                   // Integer or Buffer (Resource Descriptor)
        NominalCounterRegister,                  // Buffer (Resource Descriptor)
        DeliveredCounterRegister,                // Buffer (Resource Descriptor)
        PerformanceLimitedRegister,              // Buffer (Resource Descriptor)
        EnableRegister                           // Buffer (Resource Descriptor)
}
```

*FIG. 8*

COLLABORATIVE PROCESSOR AND SYSTEM PERFORMANCE AND POWER MANAGEMENT

This application claims the benefit and incorporates by reference herein U.S. Provisional Patent App. No. 61/563,030, filed on Nov. 22, 2011.

BACKGROUND

Technical Field

The present invention relates generally to computing systems and in particular to platform power and performance management methods and systems.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
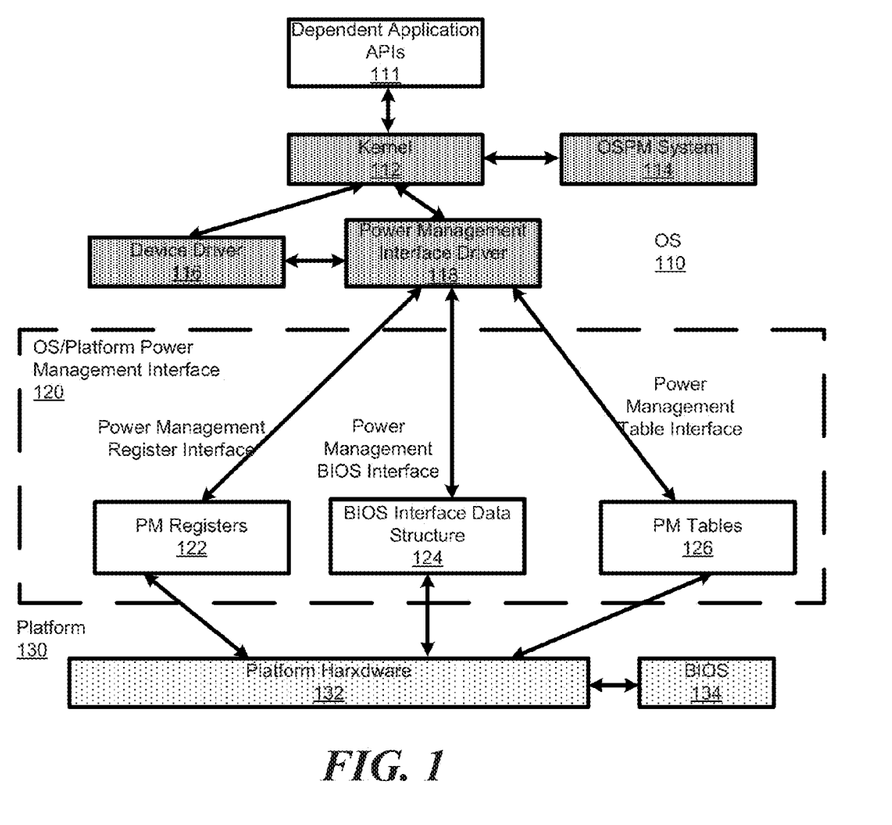
FIG. 1 is a diagram showing a computing platform with OSPM (OS-directed configuration and power management) in accordance with some embodiments.

FIG. 1 is a diagram showing a computing platform with an OSPM (OS-directed configuration and power management) based operating system (simply OS hereafter). An OSPM scheme may include any suitable power management system, interface, and/or specification that facilitates an interface to enable operating system (OS) directed power management of a processor in a computing platform. Such OSPM schemes include, but are not limited to, ACPI (Advanced Configuration and Power Interface) specification implementations.

In FIG. 1, there is a hardware platform 130 (e.g., tablet, laptop PC, server) that executes an operating system (OS) 110, which, among other things, implements OSPM through an OSPM based power management interface 120. The platform 130 comprises platform hardware 132 and a BIOS 134. The OS comprises a kernel 112, an OSPM system 114, device drivers 116, and power management interface drivers 118, coupled as shown. The OSPM interface 120 represents common interface space including common register interface space. It generally may include power management registers 122, a BIOS interface data structure 124 and/or one or more power management tables 126. These power management interface components are accessible by the OSPM, e.g., through the power management drivers 118, for writing and reading power management data (e.g., writing control data and reading capability and feedback data) for the platform hardware.

Figure 2:
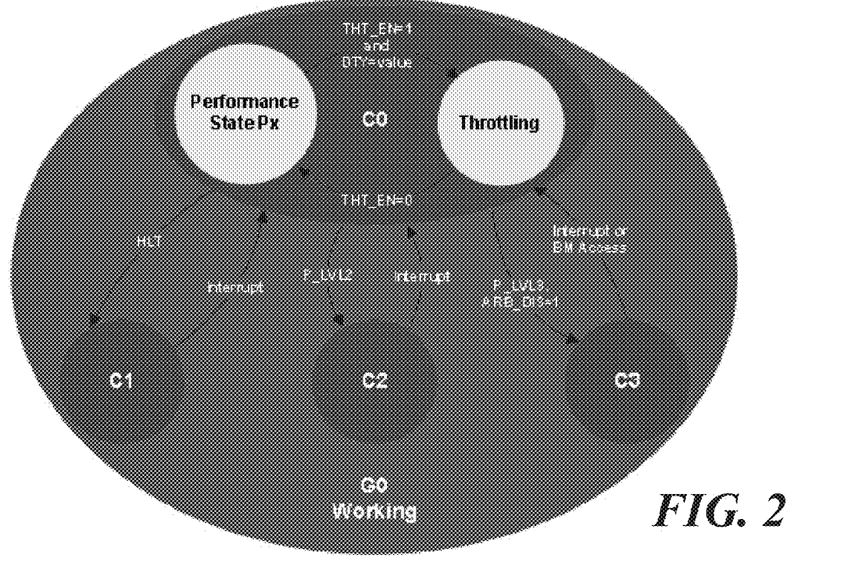
FIG. 2 shows a processor performance state diagram, in accordance with some embodiments for an ACPI implementation.

FIG. 2 shows a processor performance state diagram, in accordance with embodiments of an ACPI implementation. (Note, that this disclosure, for convenience, presents power management concepts primarily using ACPI as an exemplary implementation, but the invention is not so limited.) The major OSPM controls over the processors are processor power states (C0, C1, C2, C3, ..., Cn), processor clock throttling, and processor performance states. Processor performance states (Px), as used herein, encompass traditional Pn states like P0, P1, etc. and CPPC (Collaborative Processor Performance Control) performance controls (discussed below with pertinence to the present invention). These controls may be used in combination by OSPM to achieve the desired balance of sometimes conflicting goals including performance, power consumption and battery life, thermal requirements, and noise-level requirements. Because the goals interact with each other, the operating software needs to implement a policy as to when and where tradeoffs between the goals are to be made.

ACM defines the power state of system processors while in the G0 working state2 as being either active (executing) or sleeping (not executing). Processor power states are designated C0, C1, C2, C3, ... Cn. The C0 power state is an active power state where the CPU executes instructions. The C1 through Cn power states are processor sleeping states where the processor consumes less power and dissipates less heat than leaving the processor in the C0 state. While in a sleeping state, the processor would generally not execute instructions.

In the past, processor performance controls (Pn-state controls) have primarily affected processor performance in terms of processor frequency, which generally corresponds to processor performance capability. The OSPM would make a performance state request (e.g., P0 with a particular frequency selection), and it could expect the processor to provide it with a certain operating frequency or frequency range. it has been appreciated, however, that frequency is not necessarily proportional to the amount of work that a processor can perform, especially for all scenarios. That is, while processor frequency is a rough approximation of the speed at which the processor completes work, workload performance isn't guaranteed to scale with frequency. Therefore, rather than prescribe a specific metric for processor performance, CPPC (collaborative processor performance control) leaves the definition of the exact performance metric to the platform.

The platform, for example, may choose to use a single metric such as processor frequency, or it may choose to blend multiple hardware metrics (e.g., frequency, time, instruction rate, etc.) to create a synthetic measure of performance. In this way, the platform is more free to deliver an OSPM requested performance level without necessarily delivering a specific processor frequency, at least continually for a period of time. This, for example, allows it to meet OSPM expectations and at the same time, achieve more effective power savings.

Collaborative processor performance control (CPPC) defines an abstracted and flexible mechanism for OSPM to collaborate with an entity in the platform to manage the performance of the processor. In this scheme, the platform entity is responsible for creating and maintaining a performance definition that backs a continuous (or at least quasi-continuous) performance scale (e.g., a unit-less performance scale). During runtime, the OSPM requests performance on this scale (e.g., it request a value from between 0 and 2000, 1 and 100, or whatever), and the platform entity is responsible for translating the OSPM performance requests into actual hardware performance states.

In some embodiments, the OSPM should make no assumption about the exact meaning of the performance values presented by the platform, or how they may correlate to specific hardware metrics like processor frequency. Instead, the OSPM may, e.g., at start-up or processor hot-plug, run a characterization routine to evaluate the provided performance (e.g., frequency or benchmark, processing rate, etc.) over the particular platform's scale of available performance values.

Figure 3:
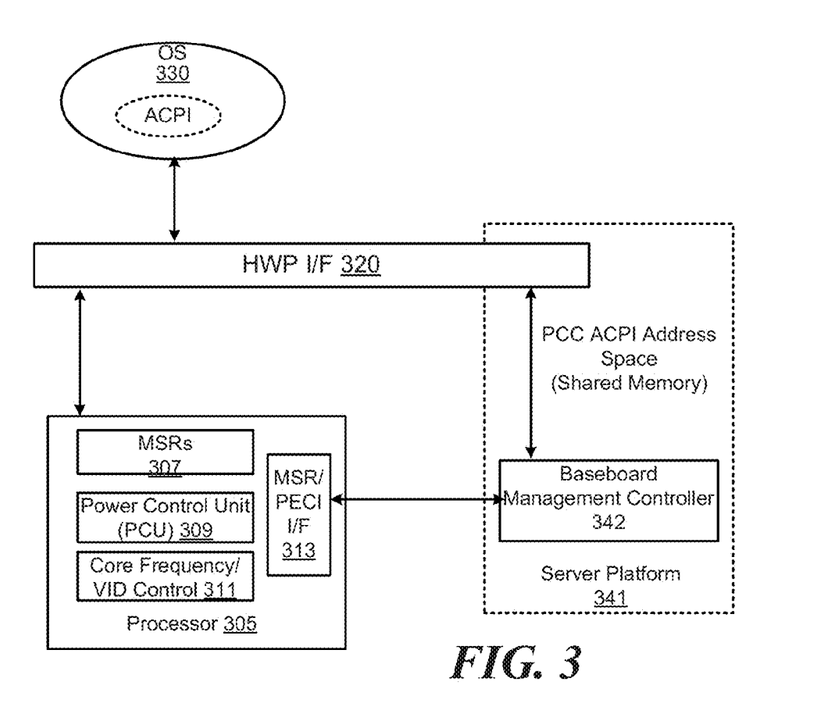
FIG. 3 is a diagram showing a platform with OSPM, illustrating different ways that OSPM can communicate with the platform to manage performance in accordance with some embodiments.

With reference to FIG. 3, the control structures (e.g., registers) for implementing the power management interface for the OSPM to control the platform power management system may be done in any suitable way. For example, the control methods may be implemented by memory mapped IO or with specific physical registers such as with MSRs (model specific registers), registers on other busses or transports (e.g. on a SMBus, PECI interface, Platform Communications Channel, etc.), virtual registers, or the like. (Note that an MSR is typically not part of memory space, but rather, for example, may exist in hardware such as a processor register with one or more instructions to read/write to it.) This provides sufficient flexibility so that the OS can communicate with the processor itself, the platform chipset, or a separate entity (e.g., a Baseboard management controller).

FIG. 3 is a diagram showing a platform with OSPM, illustrating these different ways that the OS can communicate with the platform to manage performance. In this embodiment, the processor 305 has MSRs 307, a power control unit (PCU) 309, core frequency and VID control. 311, and an MSR/PECI interface 313 for controlling performance and power consumption. An OS 330 manages power and performance of the platform through its ACPI based power management system (its ACPI based OSPM). A hardware platform (HWP) interface 320 facilitates communication between the OS and platform processor 305, thereby enabling the OS to oversee processor power management. (Note that MSR/PECI interface 313 could be considered part of the MVP interface 320, but is separately shown for convenience, coupled to the optional BMC connection.)

Figure 4:
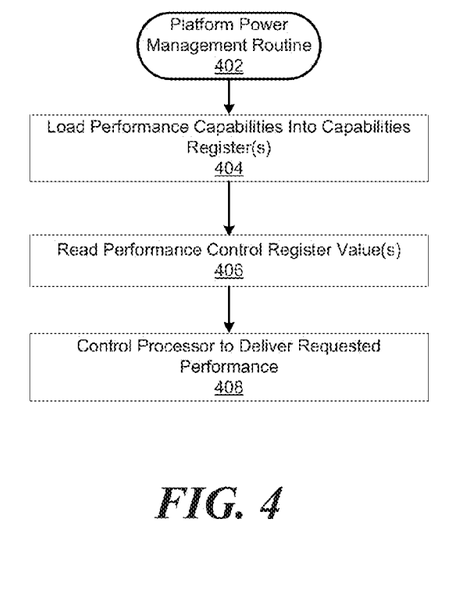
FIG. 4 shows a general routine for a platform to facilitate a flexible power management scheme in accordance with some embodiments.
Figure 5:
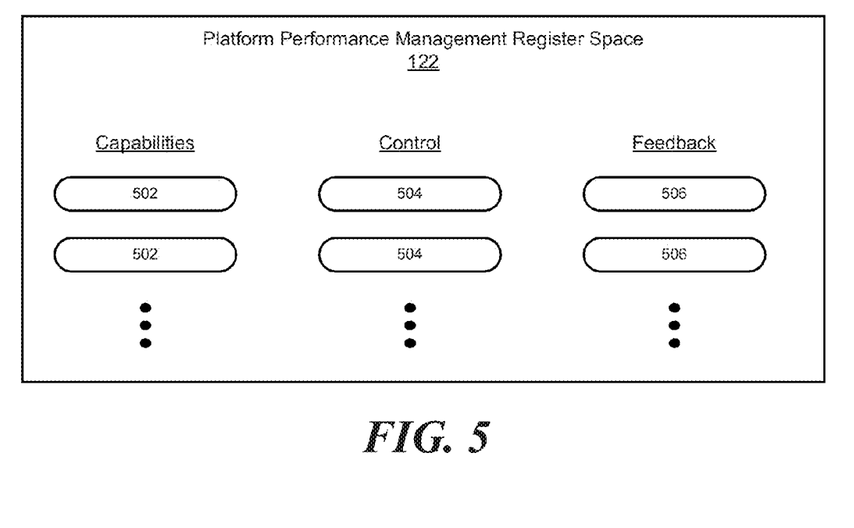
FIG. 5 shows power management registers that may be implemented in a power management register interface in accordance with some embodiments.

With reference to FIGS. 4 and 5, a general approach for implementing a flexible power management scheme using power management interface registers, accessible by both the platform and OS, will be described. FIG. 4 shows a general routine 402 for a platform to facilitate a flexible power management scheme, as discussed herein, in accordance with some embodiments. FIG. 5 shows power management registers, which may be implemented in PM register space 122 (from FIG. 1) or in any other suitable manner. The interface registers comprise one or more capabilities registers 502, one or more control registers 504, and one or more feedback registers 506.

Capabilities registers 502 are generally used to indicate performance scale parameters, capabilities, thresholds, etc, to be read by the OS so that it can determine how to manage power and performance. The control registers 504 are generally written to by the OSPM to indicate requested/desired performance from the platform processor, along with governing constraints. Finally, the feedback registers 506 indicate delivered performance (estimated or measured/monitored performance) parameters, e.g., to be read by the OS so that it can determine if the delivered performance is sufficiently close to requested/desired performance.

With reference to routine 402, initially, at 404, the performance capabilities are loaded into capabilities registers. This may involve data being transferred, e.g., from a BIOS memory, to the capabilities registers, or from any other suitable place, or the registers may have been loaded during a manufacturing step, e.g., using fuses or the like. These capabilities could indicate the abstract performance scale range, thresholds such as guaranteed versus non guaranteed thresholds, and other parameters. At 406, (e.g., after control registers have been written to by the OSPM, the platform reads control values from the control registers. At 408, the platform then (e.g., through a PCU or similar unit) controls the processor in an attempt to provide the requested performance, given the constraints. As will be addressed more below with particular respect to an ACPI implementation, it may (if in a non guaranteed range) or it will, if reasonably possible (if in a guaranteed range and without any overriding constraint e.g. thermal) provide the requested performance. This could mean providing an average performance level, within a designated tolerance, over a designated period of time.

In accordance with ACPI specifications, as well as with some embodiments, a CPC (Continuous Performance Control) object (_CPC object in ACPI or any other suitable object) may be used. This object may declare an interface that allows OSPM to transition the processor into a performance state based on a continuous range of allowable values. The OS may write the desired performance value to a performance level (e.g., "Desired Performance Register" in ACPI), and the platform would then map the requested performance level to an internal performance state.

Figure 8:
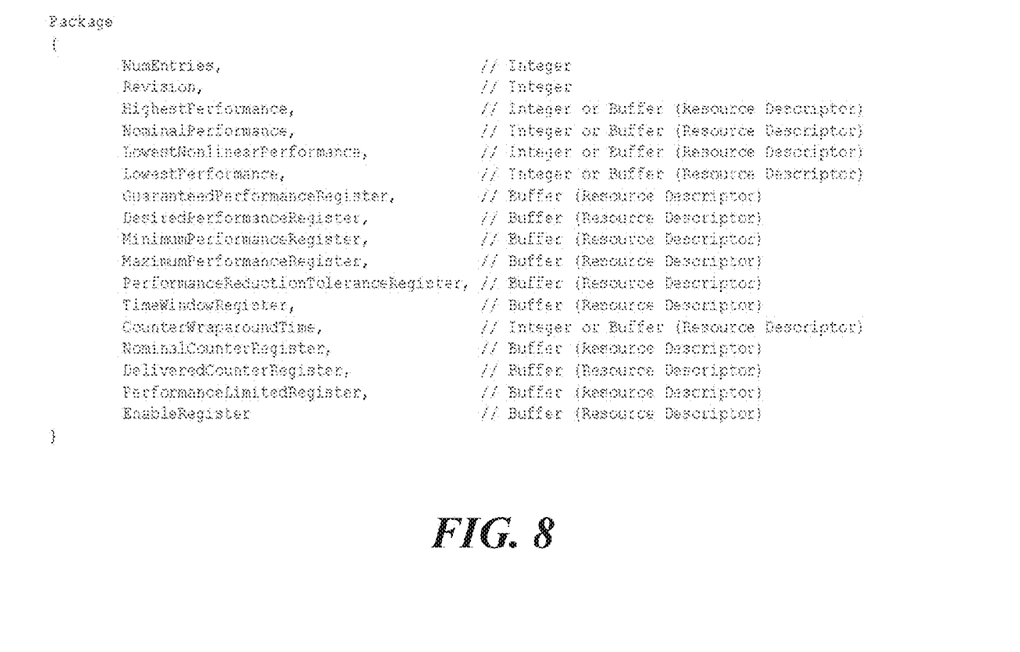
FIG. 8 shows definition code for an exemplary package for a flexible power management interface (CPPC interface defined in ACPI) in accordance with some embodiments.

Table 1 (as well as FIG. 8, CPC object) shows an exemplary package for this CPC interface.

TABLE 1

| Element | Object Type | Description |
| --- | --- | --- |
| NumEntries | Integer | The number of entries in the _CPC package, including this one. Current value is 17. |
| Revision | Integer (BYTE) | The revision number of the _CPC package format. Current value is 1. |
| Highest Performance | Integer (DWORD) or Buffer | Indicates the highest level of performance the processor is theoretically capable of achieving, given ideal operating conditions. If this element is an Integer, OSPM reads the integer value directly. If this element is a Buffer, it must contain a Resource Descriptor with a single Register( ) to read the value from. |
| Nominal Performance | Integer (DWORD) or Buffer | Indicates the highest sustained performance level of the processor. If this element is an Integer, OSPM reads the integer value directly. If this element is a Buffer, it must contain a Resource Descriptor with a single Register( ) to read the value from. |
| Lowest Nonlinear Performance | Integer (DWORD) or Buffer | Indicates the lowest performance level of the processor with non-linear power savings. If this element is an Integer, OSPM reads the |

TABLE 1-continued

| Element | Object Type | Description |
|---|---|---|
| Lowest Performance | Integer (DWORD) or Buffer | integer value directly. If this element is a Buffer, it must contain a Resource Descriptor with a single Register( ) to read the value from. Indicates the lowest performance level of the processor. If this element is an Integer, OSPM reads the integer value directly. If this element is a Buffer, it must contain a Resource Descriptor with a single Register( ) to read the value from. |
| Guaranteed Performance Register | Buffer | Optional. If supported, contains a resource descriptor with a single Register( ) descriptor that describes the register to read the current guaranteed performance from. See the section "Performance Limiting" for more details. |
| Desired Performance Register | Buffer | Contains a resource descriptor with a single Register( ) descriptor that describes the register to write the desired performance level to. |
| Minimum Performance Register | Buffer | Optional. If supported, contains a resource descriptor with a single Register( ) descriptor that describes the register to write the minimum allowable performance level to. The value 0 is equivalent to Lowest Performance (no limit). |
| Maximum Performance Register | Buffer | Optional. If supported, contains a resource descriptor with a single Register( ) descriptor that describes the register to write the maximum allowable performance level to. All 1s is equivalent to Highest Performance (no limit). |
| Performance Reduction Tolerance Register | Buffer | Optional. If supported, contains a resource descriptor with a single Register( ) descriptor that describes the register to write the performance reduction tolerance. |
| Time Window Register | Buffer | Optional. If supported, contains a resource descriptor with a single Register( ) descriptor that describes the register to write the nominal length of time (in ms) between successive reads of the platform's delivered performance register. See the section "Time Window Register" for more details. |
| Counter Wraparound Time | Integer (DWORD) or Buffer | Optional. If supported, indicates the minimum time to counter wraparound, in seconds. If this element is an Integer, OSPM reads the integer value directly. If this element is a Buffer (and supported), it must contain a Resource Descriptor with a single Register( ) to read the value from. |
| Nominal Counter | Buffer | Contains a resource descriptor with a single Register( ) descriptor that describes the register to read a counter that accumulates at a rate proportional the nominal performance of the processor. |
| Delivered Counter Register | Buffer | Contains a resource descriptor with a single Register( ) descriptor that describes the register to read a counter that accumulates at a rate proportional to the delivered performance of the processor. |
| Performance Limited Register | Buffer | Contains a resource descriptor with a single Register( ) descriptor that describes the register to read to determine if performance was limited. A nonzero value indicates performance was limited. This register is sticky, and will remain set until reset or OSPM clears it by writing 0. See the section "Performance Limiting" for more details. |
| Enable Register | Buffer | Optional. If supported, contains a resource descriptor with a single Register( ) descriptor that describes a register to which OSPM writes a One to enable CPPC on this processor. Before this register is set, the processor will be controlled by legacy mechanisms (ACPI P-states, firmware, etc.). |

The register conveyed by the _CPC object provides OSPM with platform-specific performance capabilities/thresholds and control registers that OSPM uses to control and the platform's processor performance settings. These are described further in the sections that follow. Table 2 conveniently lists registers provided by the CPC object for use by the OS to manage platform power and performance.

There are different register types including capabilities/thresholds registers, control registers, and feedback registers. The capabilities/threshold registers indicate available performance parameters for the processor in question. They may be populated directly, or indirectly, by the processor OEM, or by some other appropriate entity associated with the processor's power/performance capabilities. The control registers may be populated by the OS for it to control performance by requesting performance parameters from the platform, and the feedback registers provide performance data from the platform to the OS so that it can determine if desired and/or expected performance is being delivered (but note that this is a processor local definition of performance—it is akin to asking—are you giving me the performance that I asked for?). There may be other registers, which may be addressed as well. Table 2 lists some of the registers used in an ACPI implementation.

TABLE 2

| Register Name | ACPI Location | Attributes | Size | Type |
|---|---|---|---|---|
| Highest Performance | PCC Register Space | Read; Register or DWORD Register | 8-32 bits | Performance Capabilities/Thresholds |
| Nominal Performance | PCC Register Space | Read; Register or DWORD Register | 8-32 bits | Performance Capabilities/Thresholds |

TABLE 2-continued

| Register Name | ACPI Location | Attributes | Size | Type |
|---|---|---|---|---|
| Lowest Nominal Performance | PCC Register Space | Read; Register or DWORD Register | 8-32 bits | Performance Capabilities/Thresholds |
| Lowest Performance | PCC Register Space | Read; Register or DWORD Register | 8-32 bits | Performance Capabilities/Thresholds |
| Guaranteed Performance Register | PCC Register Space | Optional; Read | 8-32 bits | Performance Capabilities/Thresholds |
| Maximum Performance Register | PCC Register Space | Read/Write; Optional | 8-32 bits | Performance Control |
| Minimum Performance Register | PCC Register Space | Read/Write; Optional | 8-32 bits | Performance Control |
| Desired Performance Register | PCC Register Space | Read/Write | 8-32 bits | Performance Control |
| Performance Reduction Tolerance Register | PCC Register Space | Read/Write; Optional | 8-32 bits | Performance Control |
| Time Window Register | PCC Register Space | Read/Write; Optional; Units: milli-secnds | 8-32 bits | Performance Control |
| Nominal Performance Counter | PCC Register Space | Read; | 32 or 64 bits | Performance Feedback |
| Delivered Performance Register | PCC Register Space | Read | 32 or 64 bits | Performance Feedback |
| Counter Wraparound Time | PCC Register Space | Optional; Read; Register or DWORD; units: seconds | 32 or 64 bits | Performance Feedback |
| Performance Limited Register | PCC Register Space | Read/Write | >=1 bit(s) | Performance Feedback |
| Enable Register | PCC or System I/O Register Space | Optional; Read/Write | >=1 bit(s) | Enable |
| Nominal Performance Counter | PCC Register Space | Read; | 32 or 64 bits | Performance Feedback |
| Delivered Performance Register | PCC Register Space | Read | 32 or 64 bits | Performance Feedback |
| Counter Wraparound Time | PCC Register Space | Optional; Read; Register or DWORD; units: seconds | 32 or 64 bits | Performance Feedback |
| Performance Limited Register | PCC Register Space | Read/Write | >=1 bit(s) | Performance Feedback |
| Enable Register | PCC or System I/O Register Space | Optional; Read/Write | >=1 bit(s) | Enable |

Figure 6:
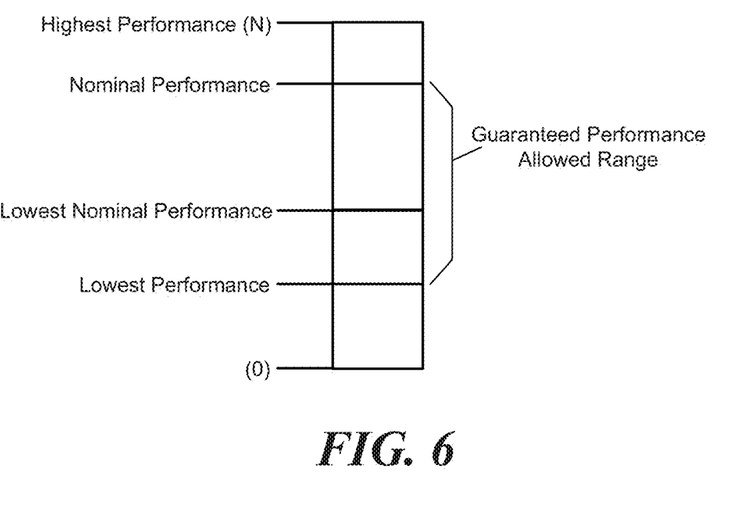
FIG. 6 shows a relative performance level scale, in accordance with some embodiments.

FIG. 6 shows a relative performance level scale, in accordance with some embodiments. Performance-based controls operate on a continuous range of processor performance levels, not discrete processor states. As a result, platform capabilities and OS requests may be specified in terms of performance thresholds. FIG. 6 graphically illustrates these performance thresholds for the platform. They are also discussed below. (Note that not all performance levels need be unique. A platform's nominal performance level may also be its highest performance level, for example. In addition, While the platform may specify register sizes within an allowable range, the size of the capabilities/thresholds registers should be compatible with the size of the control registers, discussed further below. Moreover, in some embodiments, if the platform supports CPPC, the CPC object should exist under all of the processor objects. That is, the OSPM may not be expected to support mixed modes, e.g., CPPC and legacy PSS at the same time for all processors in a platform.)

The Highest performance threshold (performance value=N) is likely to be the maximum performance an individual processor may reach, assuming ideal conditions. This performance level may not be sustainable for long durations, and may only be achievable if other platform components are in a specific state; for example, it may require other processors be in an idle state. Nominal performance is the maximum sustained performance level of the processor, assuming ideal operating conditions. In absence of an external constraint (power, thermal, etc.) this is the performance level the platform is expected to be able to maintain continuously. All processors are expected to be able to sustain their nominal performance state simultaneously. The "Lowest Nominal" performance level is the lowest performance level at which nonlinear power savings are achieved, i.e., meaningful power savings may be attained from voltage and frequency scaling. Above this threshold, lower performance levels should be generally more energy efficient than higher performance levels. In traditional terms, this represents the P-state range of performance levels. The "Lowest" performance level is the absolute lowest performance level of the platform. Selecting a performance level lower than the lowest nonlinear performance level will typically reduce the instantaneous power consumption of the processor. In traditional terms, this represents the T-state range of performance levels.

The Guaranteed Performance Register conveys to the OSPM a Guaranteed Performance level, which is the current maximum sustained performance level of a processor, taking into account known external constraints (power budgeting, thermal constraints, AC vs DC power source, etc.). Processors are expected to be able to sustain their guaranteed performance levels simultaneously. The guaranteed performance level is required to fall in the range (FIG. 9) between Lowest Performance and Nominal performance levels (inclusive).

In some embodiments, if this register is not implemented, guaranteed performance is assumed to equal nominal performance. If this register is used, the OSPM may re-evaluate the Guaranteed Performance Register. So, the platform may effectively change the nominal level, and thus, change the guaranteed performance threshold. (In some schemes, e.g., the ACPI 5 Specification, changes to guaranteed performance should not be more frequent than once per second. If the platform is not able to guarantee a given performance level for a sustained period of time (greater than one second), it should guarantee a lower performance level and opportunistically enter the higher performance level as requested by OSPM and allowed by current operating conditions.

Figure 7:
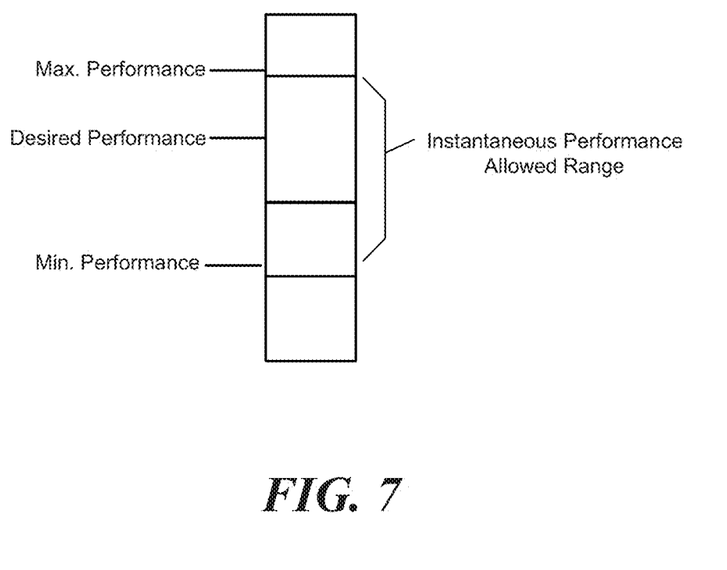
FIG. 7 is a graph showing several performance control settings that may be used to control processor performance in accordance with some embodiments.

With reference to FIG. 7, an OS with OSPM may have several performance settings to use in conjunction to control the performance of the platform. The OS may select any performance value within the continuous range of values supported by the platform. Internally, the platform may implement a small number of discrete performance states and may not be capable of operating at the exact performance level desired by the OS. If a platform-internal state does not exist that matches the OS's desired performance level, the platform may, for example, round desired performance as follows: If the OS has selected a desired performance level greater than or equal to guaranteed performance, the platform may round up or down. The result of rounding should not be less than the guaranteed performance. If the OS has selected a desired performance level less than the guaranteed performance and a maximum performance level not less than guaranteed performance, the platform should round up. If the OS has selected both desired performance level and maximum performance level less than guaranteed performance, the platform should round up if rounding up does not violate the maximum performance level. Otherwise, round down. The OS should tolerate the platform rounding down if it chooses to set the maximum performance level less than guaranteed performance. (This approach favors performance, except in the case where performance has been limited due to a platform or OS constraint.)

Some of the control registers will now be described. The OS may write appropriate values into them for desired performance. The Maximum Performance Register conveys the absolute maximum instantaneous performance level the platform may run at. Maximum performance may be set to any performance value in the range from between Lowest Performance through Highest Performance (inclusive).

This register is optional, but the platform should implement either both the Minimum Performance and Maximum Performance registers or neither register. If neither register is implemented, the platform should deliver the desired performance.

The Minimum Performance Register conveys the absolute minimum instantaneous performance level the platform may run at. Minimum performance may be set to any performance value in the range from between the Lowest Performance through the Guaranteed Performance threshold (inclusive). The Minimum performance value should not be set to a value higher than the maximum performance level.

The Minimum Performance Register is also optional, but the platform should implement either both the Minimum Performance and Maximum Performance registers or neither register. If neither register is implemented, the platform should deliver the desired performance.

The Desired Performance Register conveys the performance level that the OS is requesting from the platform. Desired performance may be set to any performance value in the range between Minimum and Maximum Performance levels (inclusive). Desired performance may take one of two meanings, depending on whether the desired performance is above or below the guaranteed performance level.

Below the guaranteed performance level, desired performance expresses the average performance level the platform should provide, subject to the Performance Reduction Tolerance. Above the guaranteed performance level, the platform should provide the guaranteed performance level. The platform should attempt to provide up to the desired performance level, if current operating conditions allow for it, but it is not required to do so.

The Time Window Register allows the OSPM to indicate a time window over which the platform should provide the desired performance level (subject to the Performance Reduction Tolerance). The OSPM sets the time window when electing a new desired performance. The time window represents the minimum time duration for OSPM's evaluation of the platform's delivered performance. If the OSPM evaluates delivered performance over an interval smaller than the specified time window, it should not have expectations of the performance delivered by the platform. On the other hand, for an evaluation interval equal to or greater than the time window, the platform should deliver the OS desired performance within the specified tolerance bound.

If the OS specifies a time window of zero or if the platform does not support the time window register, the platform should deliver performance within the bounds of Performance Reduction Tolerance irrespective of the duration of the evaluation interval.

The Performance Reduction Tolerance Register is used by the OS to convey the deviation below the Desired Performance that is tolerable. It is expressed by the OS as an absolute value on the performance scale. The performance Tolerance should be less than or equal to the Desired Performance. If the platform supports the Time Window Register, the Performance Reduction Tolerance conveys the minimal performance value that may be delivered on average over the Time Window. On the other hand, if the Time Window register is not implemented, the platform should assume that the Performance Reduction Tolerance corresponds to tolerance for the instantaneous Desired Performance.

The platform provides performance feedback via set of performance counters, and a performance limited indicator, which may be implemented in feedback registers, for example, as listed in Table 2.

To determine the actual performance level delivered over time, the OS may read a set of performance counters from the Nominal Counter Register and the Delivered Counter Register. The OS calculates the delivered performance over a given time period by taking a beginning and ending snapshot of both the nominal and delivered performance counters, and calculating:

$$\text{delivered performance} = \text{nominal performance} \times \frac{\Delta \text{delivered performance counter}}{\Delta \text{nominal performance counter}}$$

The delivered performance should fall in the range between Lowest and Highest Performance (inclusive). The OS may use the delivered performance counters as a feedback mechanism to refine the desired performance state it selects.

There are constraints that govern how and when the performance delivered by the platform may deviate from the OS Desired Performance. Corresponding to OSPM setting a Desired Performance: at any time after that, the following constraints on delivered performance may apply. Delivered performance can be higher than the OSPM requested desired performance if the platform is able to deliver the higher performance at the same or lower energy than if it were delivering the desired performance. The Delivered performance may be higher or lower than the OSPM desired performance if the platform has discrete performance states and needed to round down performance to the nearest supported performance level in accordance with the algorithm prescribed in the OS controls section. The Delivered performance may be lower than the OS desired performance if the platform's efficiency optimizations caused the delivered performance to be less than desired performance. However, the delivered performance should generally not be lower than the OSPM specified The Performance Reduction Tolerance provides a bound to the platform on how aggressive it can be when optimizing performance delivery. The platform should not perform any optimization that would cause delivered performance to be lower than the OS specified Performance Reduction Tolerance.

The nominal counter register counts at a fixed rate any time the processor is active. It is not affected by changes to Desired Performance, processor throttling, etc The delivered performance counter increments any time the processor is active, at a rate proportional to the current performance level, taking into account changes to Desired Performance. When the processor is operating at its nominal performance level, the delivered performance counter increments at the same rate as the nominal performance counter.

The Counter Wraparound Time provides a means for the platform to specify a rollover time for the Nominal/Delivered performance counters. If greater than this time period elapses between OSPM querying the feedback counters, then the counters may wrap without OSPM being able to detect that they have done so. If not implemented (or zero), the performance counters are assumed to not wrap during the lifetime of the platform.

With the Guaranteed Performance register, the platform indicates predictable limitations to the performance it can deliver. In the event that the platform must constrain the delivered performance to less than the desired performance (or, less than the guaranteed performance, if desired performance is greater than guaranteed performance) due to an unpredictable event, the platform sets the performance limited indicator to a non-zero value. This indicates to the OS that an unpredictable event has limited processor performance, and the delivered performance may be less than desired performance. The performance limited indicator is sticky, and will remain non-zero until the OS clears it by writing a 0 to the register.

The performance limited register should only be used to report short term, unpredictable events (e.g., PROCHOT being asserted). If the platform is capable of identifying longer term, predictable events that limit processor performance, it should use the guaranteed performance limit to notify the OS of this limitation. Changes to guaranteed performance should not be more frequent than once per second. If the platform is not able to guarantee a given performance level for a sustained period of time (greater than one second), it should guarantee a lower performance level and opportunistically enter the higher performance level as requested by the OS and allowed by current operating conditions.

The Enable register is an optional read/write register, one or more bits in length, that may be in PCC or system I/O space—this is in MSR. If supported by the platform, the OS writes a one to this register to enable CPPC on the given processor. If not implemented, the OS assumes the platform has CPPC enabled.

OS Characterization

In order for an OS to use a unit-less, performance scaled interface (given the abstract, relative nature of the scale), the OS should, in most embodiments, initially characterize the workload performance that is delivered by the interface. This could be done in a variety of ways. For example, it could be done by selecting performance range values while autonomous platform power management features (e.g., energy efficiency optimization features that unilaterally vary performance parameters within Min. and Max. limits to save power) are disabled. For example, turning them off in an ACPI implementation could be done by either setting the minimum, maximum, and desired input to the same value, or by setting the time window to zero. Of course, with non ACPI implementations, other approaches for restraining the platform could be used to identify what each (or a cross-section) of the performance values means to the OS.

In some embodiments, the OS selects values in the performance value range from Lowest to Nominal (inclusive), while running a characterization workload, and observes the work result. In other embodiments, the OS selects values in the same range (Lowest through Nominal) and reads statistical counters, e.g., ACPI ACNT and MCNT MSRs, which convey the resultant frequency of the logical processor.

The characterization workload could be one that requires a minimum quality of service to achieve a desired result. By characterizing what performance value achieves the minimum QoS, the OS could then later set that value as minimum whenever that kind of workload is active to ensure the QoS is met. Otherwise the characterization result e.g. frequency could be used by the OS in the implementation of a demand-based switching policy for performance state control where the performance state is selected based upon the workload (how busy) of the logical processor. Note that there may be several kinds of characterization workloads and these could be used to determine multiple QOS minimums (corresponding to the workload type).

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A memory storage device having instructions that when executed, implement an operating system (OS) power management method, comprising:
    reading one or more platform power management interface registers to determine a range of available performance values;
    selecting a plurality of performance values, wherein a platform is inhibited from varying a performance above or below a selected performance level when selected; and
    evaluating platform performance for the plurality of selected performance values, wherein an OS is to select values in the performance value range from a Lowest through a Nominal value, while running a characterization workload.

2. The memory storage device of claim 1, in which inhibiting includes selecting performance value parameters that set a minimum, maximum, and desired performance value to the same value.

3. The memory storage device of claim 1, in which the OS is to evaluate the resulting performances for the selected values.

4. The memory storage device of claim 3, in which different characterization workloads are used to evaluate performance levels for different processing task types.

5. The memory storage device of claim 4, in which at least one of the processing task types includes a quality of service (QoS) task type to determine minimum performance levels desired for one or more different QoS scenarios.

6. A computing platform having an Operating System (OS) that, when executing, performs a method, comprising:
    reading one or more platform power management interface registers to determine a range of available performance values;
    selecting a plurality of performance values, wherein a platform is inhibited from varying a delivered performance above or below a selected performance level when selected; and
    evaluating platform performance for the plurality of selected performance values,
    wherein an OS is to select values in the performance value range from a Lowest through a Nominal value, while running a characterization workload.

7. The computing platform of claim 6, in which inhibiting includes selecting performance value parameters that set a minimum, maximum, and desired performance value to the same value.

8. The computing platform of claim 6, in which the OS is to evaluate the resulting performances for the selected values.

9. The computing platform of claim 8, in which different characterization workloads are used to evaluate performance levels for different processing task types.

10. The computing platform of claim 9, in which at least one of the processing task types includes a quality of service (QoS) task type to determine minimum performance levels desired for one or more different QoS scenarios.

* * * * *